United States Patent
Rhyne et al.

(10) Patent No.: US 12,487,205 B2
(45) Date of Patent: Dec. 2, 2025

(54) ACOUSTIC SAND MONITOR

(71) Applicant: Chevron U.S.A. Inc., San Ramon, CA (US)

(72) Inventors: Lee David Rhyne, Cypress, TX (US); Peter Crowder, Houston, TX (US); Hariprasad Janakiram Subramani, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 288 days.

(21) Appl. No.: 18/553,701

(22) PCT Filed: Mar. 31, 2022

(86) PCT No.: PCT/US2022/022965
§ 371 (c)(1),
(2) Date: Oct. 2, 2023

(87) PCT Pub. No.: WO2022/212797
PCT Pub. Date: Oct. 6, 2022

(65) Prior Publication Data
US 2024/0175848 A1    May 30, 2024

Related U.S. Application Data (60) Provisional application No. 63/170,156, filed on Apr. 2, 2021.

(51) Int. Cl.
*G01N 29/14* (2006.01)
*G01F 22/00* (2006.01)
*E21B 43/34* (2006.01)

(52) U.S. Cl.
CPC ............. *G01N 29/14* (2013.01); *G01F 22/00* (2013.01); *E21B 43/35* (2020.05); *G01N 2291/0232* (2013.01)

(58) Field of Classification Search
None
See application file for complete search history.

(56) References Cited

U.S. PATENT DOCUMENTS 4,147,620 A * 4/1979 Artiano ..................... B07C 5/34
209/941
5,690,811 A * 11/1997 Davis .................... E21B 41/005
134/1

(Continued)

FOREIGN PATENT DOCUMENTS

| CA | 3015783 A1 | 2/2019 |
| WO | 2020102631 A1 | 5/2020 |

OTHER PUBLICATIONS

European Search Report for EP 22 78 2267.3 dated Jan. 20, 2025, 16 pages.

(Continued)

*Primary Examiner* — Suman K Nath
(74) *Attorney, Agent, or Firm* — King & Spalding LLP (57) ABSTRACT

An acoustic sand monitor system includes an exciter assembly and a receiver that are configured to be coupled to an accumulator vessel. Separating equipment separates sand from a fluid stream produced by a well. The accumulator vessel collects the sand separated from the fluid stream. The exciter assembly causes vibrations of the accumulator vessel and the receiver measures audio signals generated by the vibrations of the accumulator vessel. A control system analyzes the audio signal to determine the amount of sand collected in the accumulator vessel.

20 Claims, 8 Drawing Sheets

(56) References Cited

U.S. PATENT DOCUMENTS

| | | | |
|---|---|---|---|
| 6,837,098 B2 | 1/2005 | Gysling et al. | |
| 11,154,796 B2 * | 10/2021 | Hickie | B01D 21/245 |
| 2005/0109112 A1 | 5/2005 | Gysling et al. | |
| 2010/0147332 A1 | 6/2010 | Rhyne et al. | |
| 2011/0309002 A1 | 12/2011 | Coveley | |
| 2012/0006757 A1 | 1/2012 | Lehman et al. | |
| 2015/0292313 A1 | 10/2015 | Morin et al. | |

OTHER PUBLICATIONS

Mahmud, Hisham Ben, et al.; "Sand production: A smart control framework for risk mitigation"; ScienceDirect, Petroleum, vol. 6, No. 1; Mar. 31, 2020, pp. 1-13.

International Search Report and Written Opinion dated Jul. 6, 2022 for PCT/US2022/022965.

Emerson Automation Solutions brochure, Rosemount Level Measurement Solutions, dated Sep. 2020.

* cited by examiner

ACOUSTIC SAND MONITOR

RELATED APPLICATIONS

The present application is a 371 national phase application of PCT/US2022/022965 filed Mar. 31, 2022, which application claims the benefit of U.S. Provisional Patent Application No. 63/170,156 filed Apr. 2, 2021 and titled "Acoustic Sand Monitor". The entire content of the foregoing applications are incorporated herein by reference.

TECHNICAL FIELD

Embodiments of the technology relate generally to an acoustic sand monitor.

BACKGROUND

Wells are drilled into land and subsea formations in order to produce resources such as hydrocarbons and water. When conducting well production operations, the presence of particulate solids, generally referred to herein as sand, in the fluid stream produced from the well presents challenges for the operations. The presence of sand in the fluid stream can harm and erode equipment and slow down the efficiency of the production operations. In both onshore and offshore well production, the presence and amount of sand in the fluid stream can be intermittent and difficult to predict. Situations such as water breakthrough in a well, failure of a gravel pack, and flowback in a hydraulic fracturing operation can cause spikes in the volume of sand in the fluid stream.

A variety of techniques are employed to address the presence of sand in a fluid stream. One approach involves using sand screens and/or gravel packs in the well to filter sand as it flows in the fluid stream from the formation into the well. However, for situations where sand screens and/or gravel packs are not available or are not completely effective in filtering sand, other techniques are used to remove sand from the fluid stream after the fluid stream leaves the well. For example, well production operations typically include separating equipment (e.g. a de-sander and accumulator) that removes sand from the fluid stream after it flows from a well. The sand removed from the fluid stream is collected in an accumulator. The sand collected in the accumulator must be removed periodically for disposal.

Existing separating equipment uses various methods for detecting the accumulation of sand in the accumulator. One example involves taking infrared images of the accumulator, however, such images often lack accuracy. Another example is to suspend the accumulator from a load cell that measures changes in weight as sand collects in the accumulator. However, measurements from load cells often lack accuracy. Additionally, the de-sander and accumulator are typically large cylindrical vessels that can range in size from 6 to 15 feet tall with an inner diameter ranging from 6 to 12 inches. Given the sizes of the de-sander and accumulator, installation of the load cell can be costly and can interfere with the arrangement of the de-sander and accumulator.

Other approaches involve invasive measuring devices, such as gamma ray probes or vibrating forks, that must be installed into the accumulator. However, these measuring devices can be expensive and their installation into the accumulator can cause leaks and other complications due to the pressure in the accumulator.

Accordingly, there is a need for an improved technique for measuring the volume of sand in an accumulator. Specifically, there is a need for a measuring technique that is reliable and that can provide accurate measurements of the accumulation of sand in the accumulator. Accurate measurements of the accumulation of sand assist the well operator in quickly identifying problems associated with sudden increases in sand volume in the fluid stream produced from a well. Accurate measurements of the accumulation of sand also assist the well operator in predicting the impact of erosion due to sand and the need for maintenance and replacement of separating equipment. Moreover, a measuring technique is required that avoids the costs and complexities associated with load cells and invasive measuring probes.

Therefore, an improved technique for measuring sand volumes in an accumulator would be beneficial.

SUMMARY

The present disclosure is generally directed to an acoustic sand monitor for use with sand separating equipment. In one example embodiment, the present disclosure is directed to an acoustic sand monitor system comprising a de-sander vessel that separates sand from a fluid stream and an accumulator vessel that is coupled to the de-sander vessel and that collects the sand separated from the fluid stream. The de-sander vessel is configured to be coupled to a flow line containing the fluid stream. Coupled to the accumulator vessel are an exciter assembly and a receiver. When activated, the exciter assembly causes vibrations of the accumulator vessel. The receiver detects an accumulator audio signal created by vibrations of the accumulator vessel and a communications interface transmits the accumulator audio signal to a control system that analyzes the accumulator audio signal.

In the foregoing acoustic sand monitor system, the accumulator vessel may be suspended from the de-sander vessel.

In the foregoing acoustic sand monitor system, the exciter assembly may comprise a solenoid, a piezoelectric cell, or a speaker that emits an excitation audio signal.

In the foregoing acoustic sand monitor system, the receiver may comprise a microphone or a piezoelectric cell In the foregoing acoustic sand monitor system, the communications interface may comprise one of a data cable and a radio transmitter.

In the foregoing acoustic sand monitor system, the control system may be configured to compare the accumulator audio signal to a benchmark accumulator audio signal to determine a difference in frequency between the accumulator audio signal and the benchmark accumulator audio signal. Furthermore, the control system may be configured to calculate a volume of the sand in the accumulator vessel based on the difference in frequency between the accumulator audio signal and the benchmark accumulator audio signal. Moreover, the control system may be configured to compare the volume of the sand in the accumulator to a previously calculated volume of sand and may be configured to generate a report of sand volume change over time.

In the foregoing acoustic sand monitor system, the control system may predict a failure condition based on a volume of sand calculated based on the difference in frequency between the accumulator audio signal and the benchmark accumulator audio signal.

In another example embodiment, the present disclosure is directed to a method of monitoring sand accumulation in an accumulator vessel. The method comprises generating a test excitation signal from an exciter assembly coupled to the accumulator vessel, the test excitation signal causing test vibrations of the accumulator vessel; detecting, with a receiver coupled to the accumulator vessel, a benchmark accumulator audio signal generated by the test vibrations of the accumulator vessel; and transmitting, by a communications interface, the benchmark accumulator audio signal to a control system. The method further comprises generating, after a predetermined time, a production excitation signal from the exciter assembly, the production excitation signal causing production vibrations of the accumulator vessel; detecting, with the receiver, a production accumulator audio signal generated by the production vibrations of the accumulator vessel; transmitting, by the communications interface, the production accumulator audio signal to the control system; and comparing, by the control system, a frequency of the production accumulator audio signal to a frequency of the benchmark accumulator audio signal to determine a volume of sand in the accumulator vessel.

The foregoing method may further comprise, in response to determining the volume of sand in the accumulator vessel, generating, by the control system, an alert indicating an increase in the volume of sand in the accumulator vessel.

The foregoing method may further comprise, comparing, by the control system, frequencies of a plurality of production accumulator audio signals gathered from the receiver during a time period to determine a rate of change in the volume of sand during the time period. The control system may predict a failure condition based on the plurality of production accumulator audio signals gathered from the receiver during the time period. The failure condition may be one of a failed sand screen, a failed gravel pack, a water breakthrough, and failed separating equipment.

In the foregoing method, the accumulator vessel may be suspended from a de-sander vessel.

In the foregoing method, the exciter assembly may comprise a solenoid, a piezoelectric cell, or a speaker that emits an excitation audio signal.

In the foregoing method, the receiver may comprise a microphone or a piezoelectric cell.

In the foregoing method, the communications interface may comprise one of a data cable and a radio transmitter.

The foregoing embodiments are non-limiting examples and other aspects and embodiments will be described herein. The foregoing summary is provided to introduce various concepts in a simplified form that are further described below in the detailed description. This summary is not intended to identify required or essential features of the claimed subject matter nor is the summary intended to limit the scope of the claimed subject matter.

BRIEF DESCRIPTION OF THE DRAWINGS

The accompanying drawings illustrate only example embodiments of an acoustic sand monitor system and method and therefore are not to be considered limiting of the scope of this disclosure. The principles illustrated in the example embodiments of the drawings can be applied to alternate methods and apparatus. Additionally, the elements and features shown in the drawings are not necessarily to scale, emphasis instead being placed upon clearly illustrating the principles of the example embodiments. Certain dimensions or positions may be exaggerated to help visually convey such principles. In the drawings, the same reference numerals used in different embodiments designate like or corresponding, but not necessarily identical, elements.

DETAILED DESCRIPTION OF EXAMPLE EMBODIMENTS

The example embodiments discussed herein are directed to systems and methods for an acoustic sand monitor used in sand separating equipment. The example embodiments described herein can provide improvements to sand separating equipment used with producing wells. As will be described further in the following examples, the methods and apparatus described herein improve upon prior art approaches to sand separating equipment. The techniques described herein provide a less costly and less complicated approach to gathering data regarding the collection of sand in the accumulator of the sand separating equipment. Additionally, the techniques described herein provide more accurate data regarding sand accumulation when compared to prior art approaches.

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Figure 1:
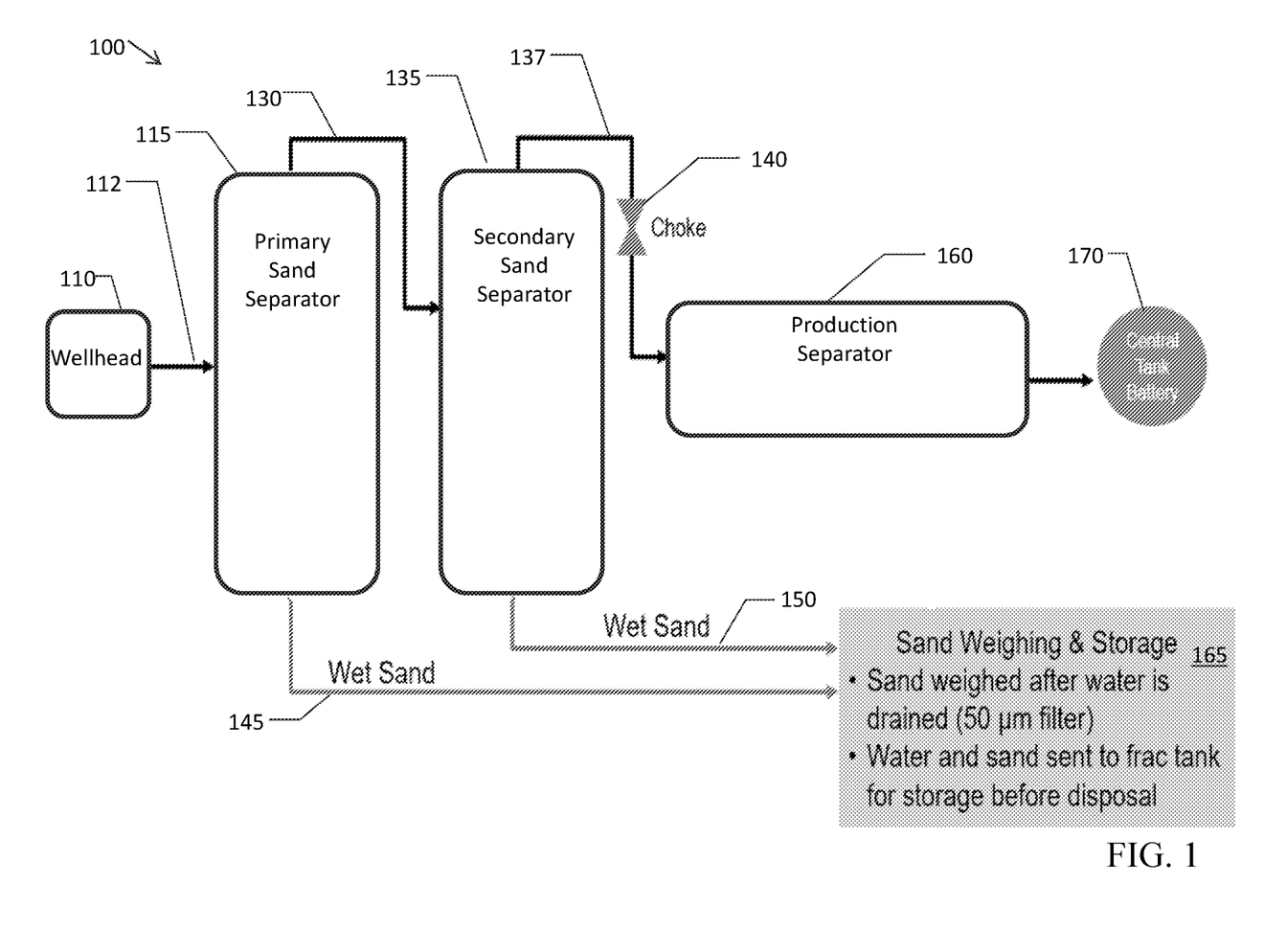
FIG. 1 is a schematic illustration of separating equipment in accordance with an example embodiment of the disclosure.
Figure 2:
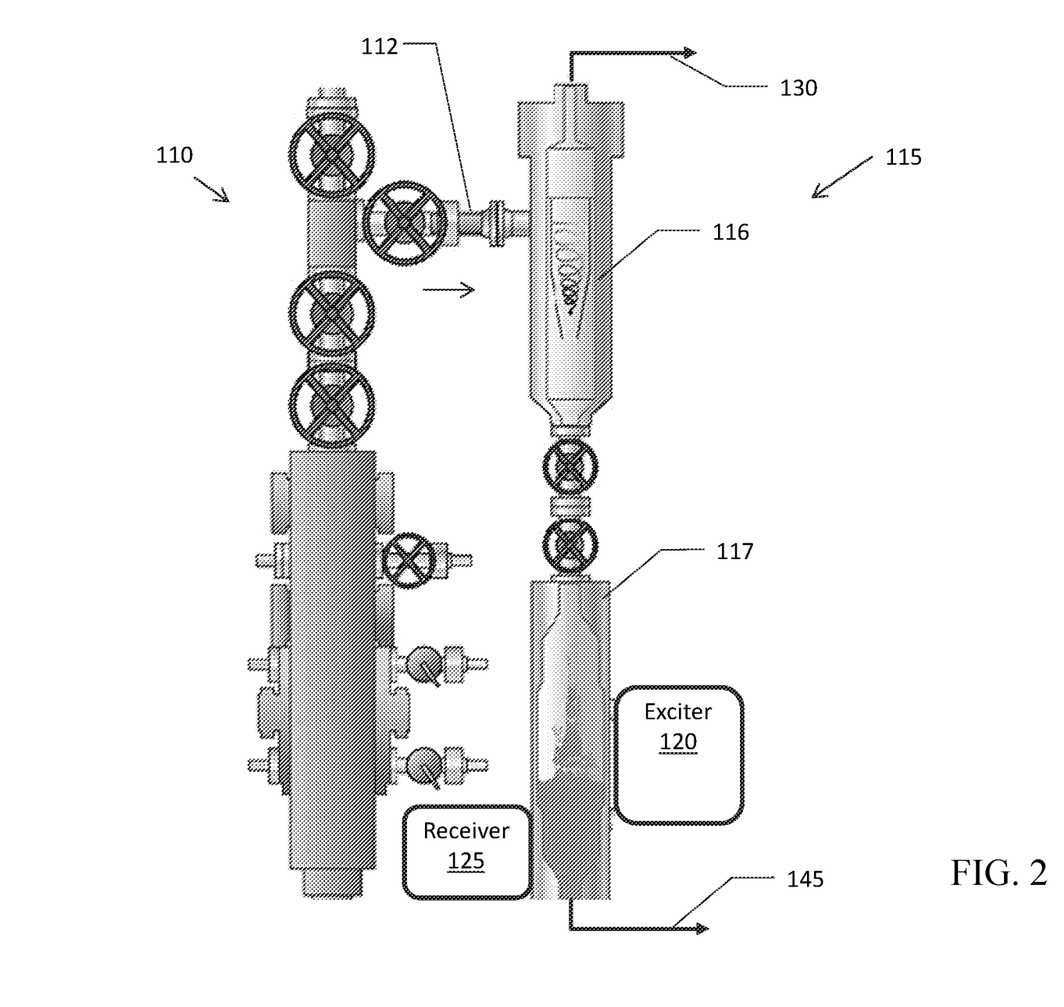
FIG. 2 provides a detailed view of a sand separator in accordance with an example embodiment of the disclosure.
Figure 3:
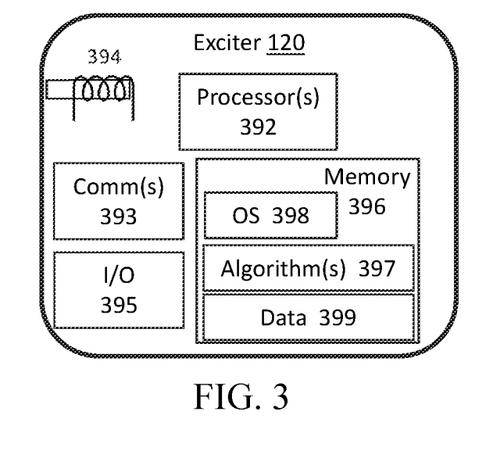
FIG. 3 is a schematic illustration of an exciter assembly in accordance with an example embodiment of the disclosure.

FIGS. 1-3 illustrate separating equipment in accordance with example embodiments of the disclosure. FIG. 1 illustrates separating equipment 100 used in conjunction with an on-shore well production operation. As described further below, the examples provided herein also can be applied to offshore well production operations. The separating equipment 100 of FIG. 1 includes a primary sand separator 115, a secondary sand separator 135, and a production separator 160. A fluid stream of a resource produced from a well is extracted at the wellhead 110 and fed into flow line 112. The resource can comprise one or more of oil, gas, and water and the fluid stream can often contain sand. Although a single wellhead 110 is illustrated in FIG. 1 for simplicity, it should be understood that separating equipment 100 is often coupled to multiple wellheads and processes fluid streams from the multiple wellheads.

The fluid stream entering the flow line 112 is typically under pressure, which can range from 100 psi to 10,000 psi. The fluid stream flows from flow line 112 into primary sand separator 115. The sand that is separated from the fluid stream in primary sand separator 115 is directed downward and exits through sand discharge line 145. The improved fluid stream with sand having been removed then flows through secondary flow line 130 and into a secondary sand separator 135. The secondary sand separator 135 is similar to the primary sand separator in that it removes sand from the fluid stream and directs the removed sand downward to secondary sand discharge line 150. The sand discharged through discharge lines 145 and 150 is directed to sand storage equipment 165 where it is dried and ultimately disposed. While a primary sand separator and a secondary sand separator are illustrated in the example of FIG. 1, it should be understood that alternate embodiments may comprise fewer or more sand separators.

Because sand can harm other equipment in the production operations, the objective is to remove the sand from the fluid stream after exiting the wellhead 110 and before it flows through tertiary flow line 137 to the choke 140. The choke 140 is used to modulate the pressure within the tertiary flow line 137. After the choke 140, the fluid stream enters a production separator 160 wherein water is separated from the oil and/or gas extracted from the well. The isolated oil and/or gas subsequently flows to a central tank battery 170 for temporary storage before transport of the oil and/or gas to downstream facilities.

FIG. 2 provides a more detailed illustration of the primary sand separator 115. As illustrated in FIG. 2, a fluid stream flows from wellhead 110, through flow line 112, and into sand separator 115. The sand separator 115 comprises two vessels, a de-sander vessel 116 and an accumulator vessel 117. In the example sand separator 115 shown in FIG. 2, the de-sander vessel 116 and the accumulator vessel 117 are both generally cylindrically shaped and have a common longitudinal axis oriented vertically. The accumulator vessel 117 is external to the de-sander vessel 116 and is suspended from the de-sander vessel 116 such that the accumulator vessel 117 does not directly contact the ground. In alternate embodiments, the sand separator can have alternate shapes and configurations. In some cases, the accumulator can be integral with the de-sander as opposed to being external. Additionally, the de-sander and/or the accumulator can be oriented so that the longitudinal axes of the vessels are oriented horizontally or sloped so that the longitudinal axes of the vessels form an acute angle with the horizon.

As the fluid stream enters the de-sander vessel 116 from the flow line 112, sand is separated from the fluid stream. Sand can be separated from the fluid stream using cyclonic techniques that cause the fluid stream to spin and cause the heavier sand particles to separate from the fluid stream. Alternatively, the de-sander vessel may rely upon gravity or other techniques to separate sand from the fluid stream. Thus, the de-sander vessel improves the fluid stream by removing sand and the improved fluid stream exits the de-sander vessel 116 via secondary flow line 130. Gravity pulls the separated sand particles downward and into the accumulator vessel 117.

The existence and amount of sand in a fluid stream from a well is often erratic and unpredictable. As described above, existing techniques for measuring the volume of sand in the accumulator vessel 117 have a variety of shortcomings. However, accurate measurement of the volume of sand in the accumulator vessel 117 is advantageous because it enables the operator to precisely monitor the volume of sand in the fluid stream over time. Precise monitoring of sand volume in the fluid stream over time enables the well operator to identify problems in the well such as water breakthrough in the well or the failure of sand screens and/or gravel packs in the well. Analyzing sand volume in the fluid stream over time also can assist the well operator in predicting the performance of the well and the need for well maintenance. Furthermore, accurate measurements of sand volume in the fluid stream are useful in predicting erosion in the separating equipment and the need for maintenance. In systems where multiple wells feed into the separating equipment 100, particular wells can be temporarily shut off and more precise sand volume measurements enable analysis of sand volumes from the fluid stream of a particular well.

More precise measurement of the volume of sand in the accumulator vessel 117 can be accomplished with the components illustrated in FIG. 2. Specifically, an exciter assembly 120 and a receiver 125 can be coupled to the accumulator vessel 117 for measuring the volume of sand. As used herein, "coupling" the exciter assembly 120 and the receiver 125 to the accumulator vessel 117 can mean a direct attachment to the accumulator vessel 117, an indirect attachment via a mount to the accumulator vessel 117, or positioning proximate (e.g., within one foot) to the accumulator vessel 117. The exciter assembly 120, when activated, provides an excitation signal that causes the accumulator vessel 117 to vibrate. The vibration of the accumulator vessel 117 will cause a corresponding accumulator audio signal in the air surrounding the accumulator vessel 117 and the receiver 125 can detect the accumulator audio signal. Changes in the volume of sand in the accumulator vessel 117 will cause corresponding changes to the vibration of the accumulator vessel 117 and the frequency of the accumulator audio signal. In example embodiments, the exciter assembly 120 and the receiver 125 can comply with explosion-proof requirements given their location at a production well. Further details and examples of the exciter assembly 120 and the receiver 125 are illustrated and described in connection with FIGS. 3, 4, and 5.

Referring to FIG. 3, an example exciter assembly 120 is illustrated. The exciter assembly 120 provides an excitation signal with a solenoid 394 that is activated to periodically contact the accumulator vessel 117 and cause the vessel to vibrate. The timing as to when the solenoid is activated and the frequency of the solenoid cycles can be controlled by the other components illustrated in the example exciter assembly 120, which will now be briefly described.

The components of the exciter assembly 120 of FIG. 3 can include, but are not limited to, one or more hardware processors 392, a memory 396, one or more input/output devices 395, and one or more communication interfaces 393. A bus (not shown) can allow the various components of the exciter assembly 120 to communicate with one another. A bus can be one or more of any of several types of bus structures, including a memory bus or memory controller, a peripheral bus, an accelerated graphics port, and a processor or local bus using any of a variety of bus architectures. The components shown in FIG. 3 are not exhaustive, and in some embodiments, one or more of the components shown in FIG. 3 may not be included in an example system. Further, one or more components shown in FIG. 3 can be rearranged.

The communication interface 393 can transmit and receive signals from sensors, actuators, and remote devices via signal transfer links. The signal transfer links can include wired and/or wireless signal transfer links that transmit and receive communications via known communication protocols. For instance, the communication interface 393 can receive wireless command signals from a remote device the direct the exciter assembly 120 to begin contacting the accumulator vessel 117.

In one or more example embodiments, the one or more hardware processors 392 execute software instructions stored in memory 396 in order to actuate the solenoid 394 and perform other functions associated with the exciter assembly 120. The memory 396 includes one or more cache memories, main memory, and/or any other suitable type of memory. The memory 396 can be a persistent storage device (or set of devices) that stores software and data used in the operation of the exciter assembly 120. In one or more example embodiments, the memory 396 can store an operating system 398, algorithms 397, and stored data 399. For example, an algorithm 397 can dictate when an operating cycle for the solenoid 394 is to be entered, how many cycles to run, and at what frequency the solenoid should contact the accumulator vessel 117. Such algorithms 397 can be based on information received via the communications interface 393, from data entered by a user via the input/output interface 395, or may be static variables that are programmed into the exciter assembly 120. Stored data can be any data associated with the exciter assembly 120 (including any components thereof), any measurements taken by sensors, time measured by a timer, adjustments to an algorithm 397, threshold values, user preferences, default values, results of previously run or calculated algorithms 397, and/or any other suitable data.

The hardware processors 392 can be an integrated circuit, a central processing unit, a multi-core processing chip, an SoC, a multi-chip module including multiple multi-core processing chips, or other hardware processor in one or more example embodiments. The hardware processor 392 is known by other names, including but not limited to a computer processor, a microprocessor, and a multi-core processor. In alternate embodiments, the one or more hardware processors 392 can be replaced by other logic devices such as one or more field programmable gate arrays (FPGAs). Using FPGAs and/or other similar devices known in the art allows the exciter assembly 120 (or portions thereof) to be programmable and function according to certain logic rules and thresholds without the use of a hardware processor.

The one or more I/O interfaces 395, such as a keyboard, display, or touch screen interface, allow a user to enter commands and information to the exciter assembly 120, and also allow information to be presented to the user and/or other components or devices.

Figure 4:
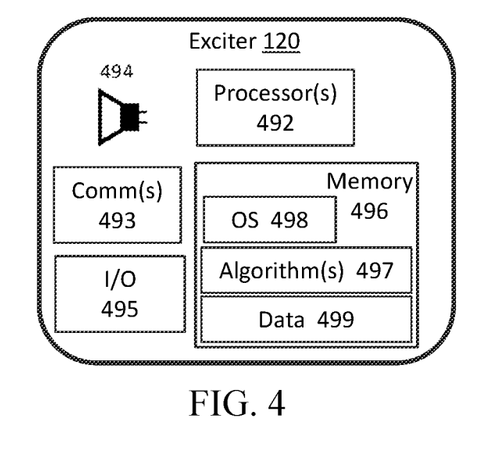
FIG. 4 is a schematic illustration of another exciter assembly in accordance with an example embodiment of the disclosure.

FIG. 4 illustrates an exciter assembly 120 in accordance with an alternative example embodiment. Exciter assembly 120 illustrated in FIG. 4 is similar to exciter assembly 120 of FIG. 3, except that the solenoid has been replaced with a speaker 494 that emits an audio excitation signal directed at the accumulator vessel 117. The audio excitation signal can be generated from data 499 or generated from an algorithm 497 stored in memory 496. The audio excitation signal emitted by the speaker 494 can be white noise or any other audio signal that is of sufficient power that it causes the accumulator vessel 117 to vibrate. The vibration of the accumulator vessel 117 causes the accumulator vessel 117 to emit an accumulator audio signal. The frequency of the accumulator audio signal is determined by the volume of sand within the accumulator vessel 117. Aside from the speaker 494, the other components of the example exciter 120 in FIG. 4 are similar to the components previously described in connection with FIG. 3. Accordingly, the description of these other components will not be repeated for FIG. 4.

Figure 5:
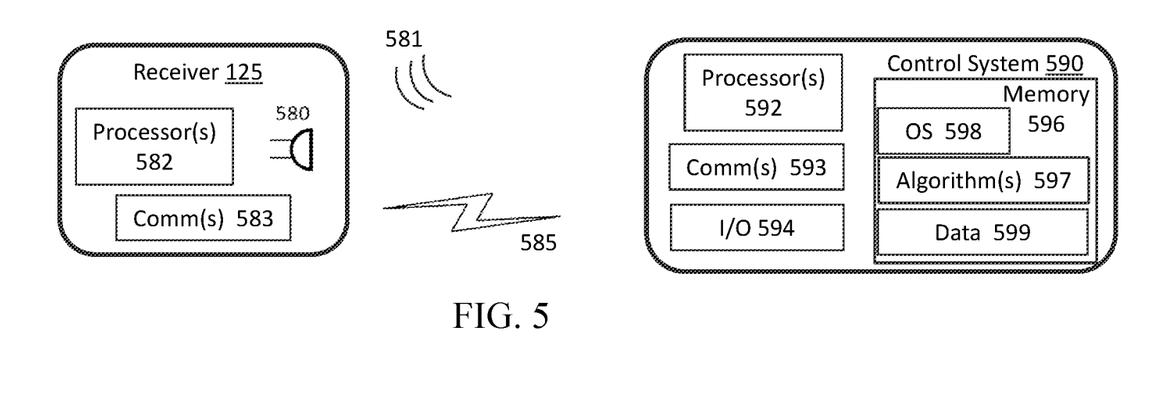
FIG. 5 is a schematic illustration of a receiver and a control system in accordance with an example embodiment of the disclosure.

FIG. 5 illustrates a receiver 125 and a control system 590 in accordance with an example embodiment of the present disclosure. The receiver 125 receives an accumulator audio signal 581 from the vibrating accumulator vessel 117. The receiver 125 includes a microphone 580 that can detect the accumulator audio signal 581. The receiver 125 further includes a hardware processor 582 for processing the detected accumulator audio signal 581 and transmitting it via communications interface 583 to control system 590. The processor may filter or convert the accumulator audio signal 581 so that it is suitable for transmitting via the communications interface 583. The foregoing descriptions of a processor and communications interface in connection with FIG. 3 apply to these similar components of receiver 125 and, therefore, a detailed description of these components will not be repeated. Additionally, although not illustrated in FIG. 5, it should be understood that the receiver 125 can optionally include components such as an input/output interface and a memory containing algorithms and data.

The communications interface 593 of the control system 590 receives the accumulator audio signal 585 from the receiver 125. As explained previously, the audio signal can be transmitted to the control system 590 via wired and/or wireless signal transfer links. Typically, wells and the associated separation equipment are in remote locations. A local power source, such as solar power or power from the power grid, supplies power to the separating equipment including the exciter assembly and the receiver. The local power source also can provide power to a local transmitter that transmits data collected from the separating equipment, such as pressure readings, to a control system at a central location. The accumulator audio signal 585 can be included as an additional data item that is transmitted with the other data collected from the separating equipment. Although the control system is typically at a central location apart from the remote wells and separating equipment, in other embodiments the control system can be proximate to the wells and separating equipment.

The control system 590 can comprise one or more computing devices that gather and analyze accumulator audio signals. In the simplified example illustrated in FIG. 5, the control system 590 comprises a memory 956 that stores an operating system, one or more algorithms 597, and data 599. The data 599 can include the accumulator audio signals detected by the receiver 125. The control system 590 also includes one or more processors 592 that can execute algorithms 597 for analyzing the data 599. An input/output interface 594, such as a graphical user interface, allows a human to view the data and enter commands. The previous detailed descriptions of processors, communication interfaces, input/output interfaces, and memory in connection with FIG. 3 apply to the similar components present in the control system 590 and, therefore, a detailed description of these components will not be repeated.

The control system 590 can be used to analyze the accumulator audio signal 585 to determine the volume of sand present in the accumulator 117. Specifically, the frequency of the accumulator audio signal 585 is directly related to the volume of sand present in the accumulator vessel 117. The control system 590 can examine the accumulator audio signal 585 to identify significant increases in the volume of sand which may indicate a problem with the well such as a water breakthrough or failure of a sand screen or gravel pack. Additionally, historical sand volume data can be analyzed to predict potential problems or needed maintenance for the well as well as erosion effects and needed maintenance for the separating equipment.

Figure 6:
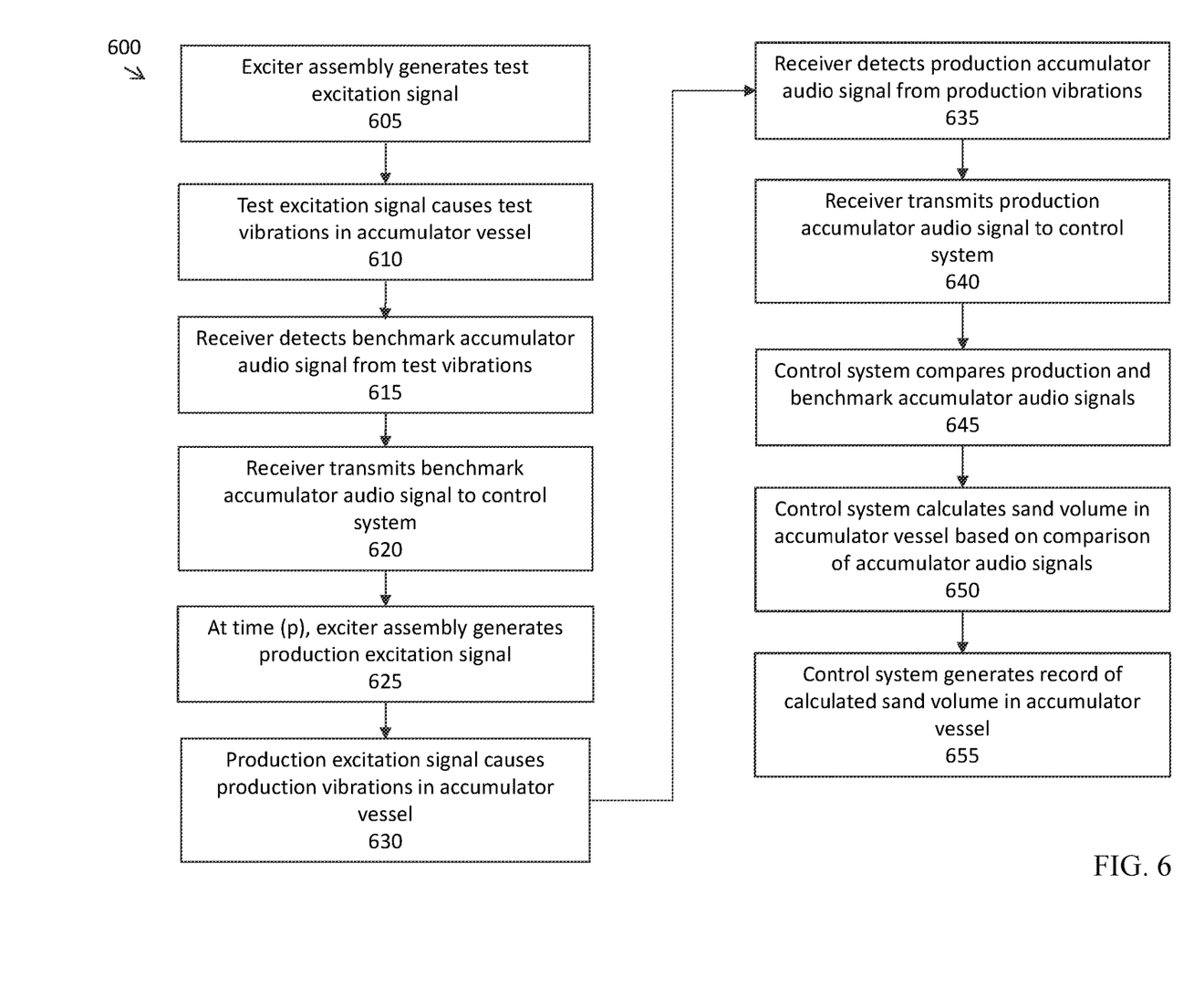
FIG. 6 is a flow chart for a method of monitoring an accumulator vessel in accordance with an example embodiment of the disclosure.

Referring now to FIG. 6, an example method 600 for monitoring the volume of sand in the accumulator vessel 117 is illustrated. It should be understood that method 600 is a non-limiting example and in alternate embodiments certain steps of method 600 may be modified or omitted. Method 600 involves a two-step process whereby an empty accumulator vessel without sand inside is first interrogated with a test excitation signal to establish a baseline. Subsequently, when well production operations are active and sand may be gathering in the accumulator vessel, the accumulator vessel is interrogated with a production excitation signal that generates a production accumulator audio signal that can be compared to the baseline.

Beginning with step 605, exciter assembly 120 generates a test excitation signal. The test excitation signal can be generated by one of the previously described methods such as a solenoid, a speaker, or another device. In step 610, the test excitation signal causes the accumulator vessel 117 to vibrate, which in turn generates a benchmark accumulator audio signal in the region surrounding the accumulator vessel 117. In step 615, the receiver 125 detects the benchmark accumulator audio signal generated by the vibrating accumulator vessel 117. In step 620, the receiver 125 transmits, via the communication interface, the recorded benchmark accumulator audio signal to control system 590 for use in later analysis. It should be understood that the operation of the separating equipment may cause vibrations of the accumulator vessel 117 that exist as background noise. The test excitation signal should be of sufficient strength to generate vibrations in the accumulator vessel 117 that in turn generate accumulator audio signals that are able to be isolated from background noise.

The benchmark accumulator audio signal would typically be measured before the separating equipment begins separating sand from a fluid stream of a producing well. Once the benchmark accumulator audio signal is established, the separating equipment can begin separating sand from a fluid stream and the accumulator vessel 117 can be monitored using the previously described equipment. Specifically, in step 625, at a predetermined time (time(p)), the exciter assembly 120 generates a production excitation signal. The predetermined time can be set by the well operator or can simply be set to coincide with the beginning of operation of the separating equipment. Additionally, the predetermined time can be a repeating interval whereby the production excitation signal is generated, for example, once per minute, once every ten minutes, or once every sixty minutes. In step 630, the production excitation signal causes production vibrations in the accumulator vessel 117. The frequency of the production vibrations in the accumulator vessel 117 will differ from the frequency of the test vibrations if sand is gathering in the accumulator vessel 117. In step 635, the receiver 125 detects a production accumulator audio signal caused by the production vibrations and, in step 640, the receiver 125 transmits the production accumulator audio signal to the control system 590.

The control system 590 can use the measured audio signals to determine the amount of sand collected in the accumulator vessel 117. Specifically, in step 645 the control system 590 compares the production accumulator audio signal to the benchmark accumulator audio signal. The control system 590 calculates the sand volume in the accumulator vessel 117 based on a comparison of the frequency of the production and benchmark accumulator audio signals in step 650. Lastly, in step 655, the control system 590 can generate a record of the calculated sand volume in the accumulator vessel 117. Optionally, the control system 590 can generate an alert if the calculations indicate an increase in sand accumulation that exceeds a predetermined threshold. Because the monitoring system provides more accurate data than prior approaches, the control system 590 can also be programmed to predict when maintenance will be needed in the well or the separating equipment based on the sand volumes calculated over time.

Figure 7A:
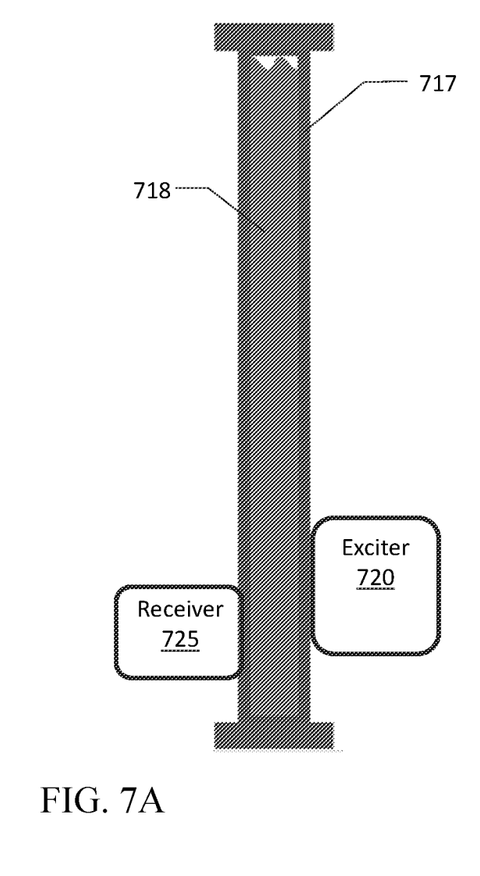
FIGS. 7A and 7B provide detailed views of a simulated accumulator vessel in accordance with an example embodiment of the disclosure.
Figure 7B:
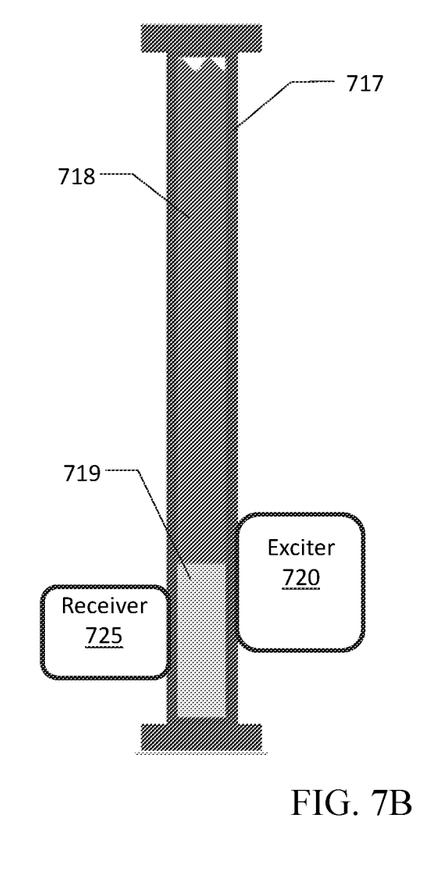
Figure 8:
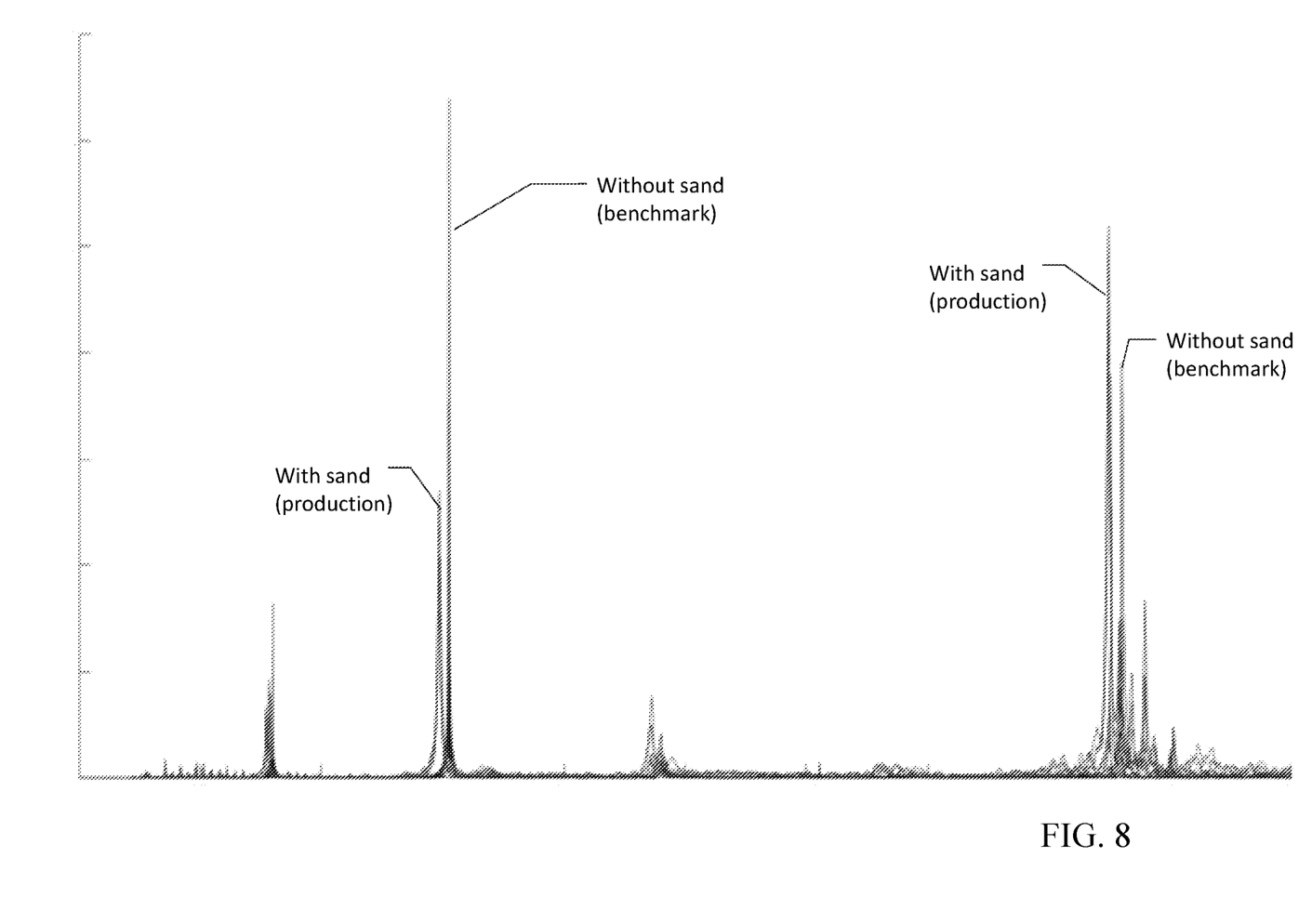
FIGS. 8 and 9 are plots of data collected from a simulation of monitoring an accumulator vessel in accordance with an example embodiment of the disclosure.
Figure 9:
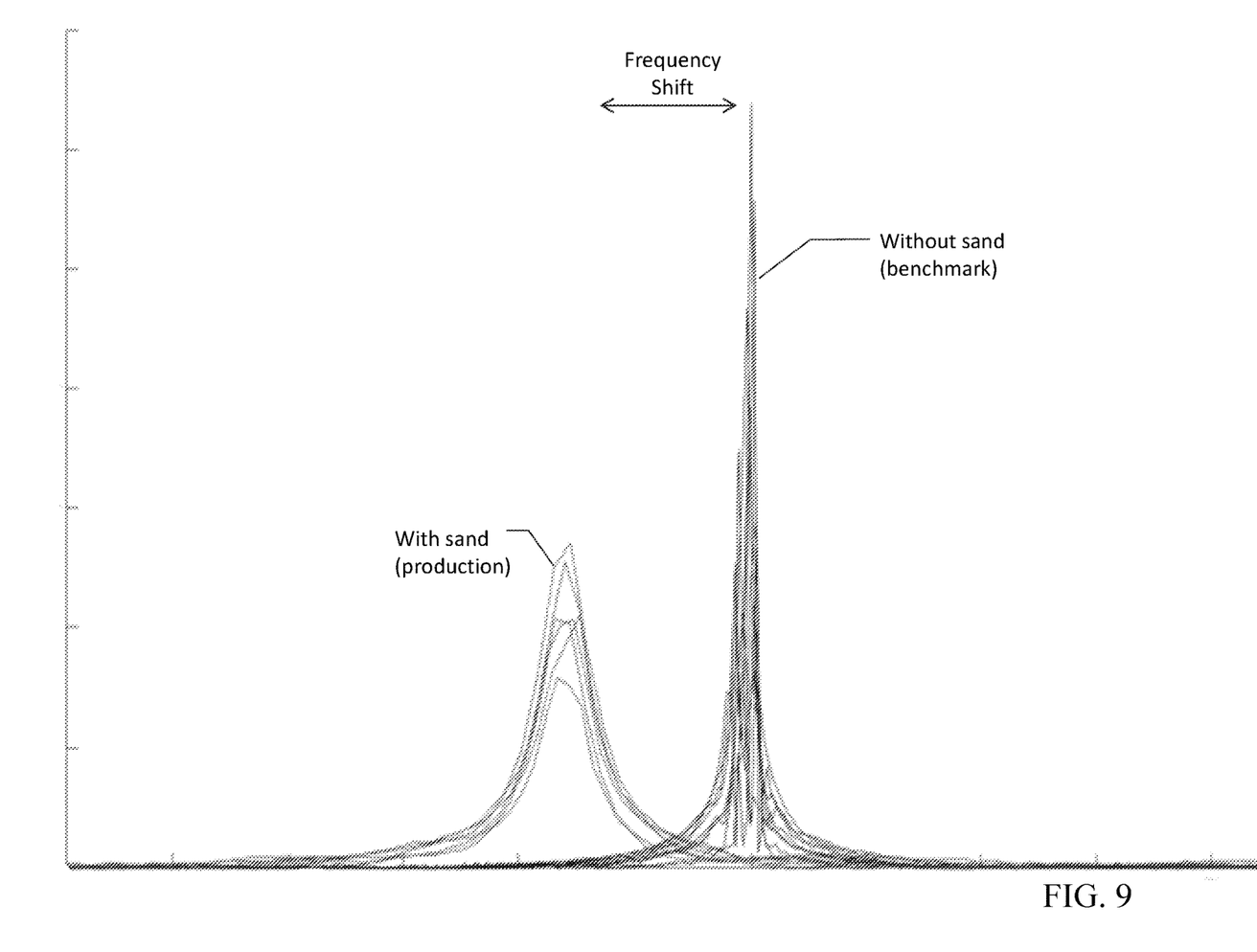

Referring now to FIGS. 7A, 7B, 8 and 9, a simulation of the monitoring system will be described. The data that is plotted in FIGS. 8 and 9 is based on tests performed on a simulated accumulator vessel. FIG. 7A illustrates the simulated accumulator vessel 717, which is a cylindrical pipe filled with water 718. The simulated accumulator vessel 717 is similar to previously described accumulator vessel 117. FIG. 7B illustrates the simulated accumulator vessel 717 that has been partially filled with sand 719. An exciter assembly 720 and a receiver 725 are coupled to the simulated accumulator vessel 717 in both FIGS. 7A and 7B. It should be understood that the exciter assembly 720 and the receiver 725 are similar in their operation and components to the previously described exciter assembly 120 and receiver 125.

During the simulation, a baseline audio signal was established with the setup illustrated in FIG. 7A. Specifically, the simulated accumulator vessel 717 containing only water 718 as shown in FIG. 7A was interrogated with a test excitation signal from the exciter assembly 720. In response, the simulated accumulator vessel 717 vibrated and emitted a benchmark accumulator audio signal that was detected by the receiver 725. In the subsequent phase of the simulation, the simulated accumulator vessel 717 was partially filled with sand 719 as shown in FIG. 7B and then the simulated accumulator vessel 717 was interrogated with a production excitation signal from the exciter assembly 720. In response to the production excitation signal, the simulated accumulator vessel 717 vibrated and emitted a production accumulator audio signal that was detected by the receiver 725.

FIG. 8 shows a plot of both the benchmark and production accumulator audio signals over a range of frequencies from approximately 100 Hz to 2000 Hz. FIG. 9 shows a plot of the same data shown in FIG. 8, but enlarged and focused in a range between 560 Hz and 650 Hz. As the data makes clear, the existence of sand in the accumulator vessel causes a shift to a lower frequency in the audio signal detected by the receiver. The magnitude of the frequency shift is proportional to the volume of sand present in the accumulator vessel and, therefore, can be used to determine the amount of sand that has collected in the accumulator vessel. Therefore, the simulation illustrated in FIGS. 7A, 7B, 8, and 9 demonstrates that the acoustic sand monitoring system can be used to accurately measure the volume of sand that collects in the accumulator vessel.

Figure 10:
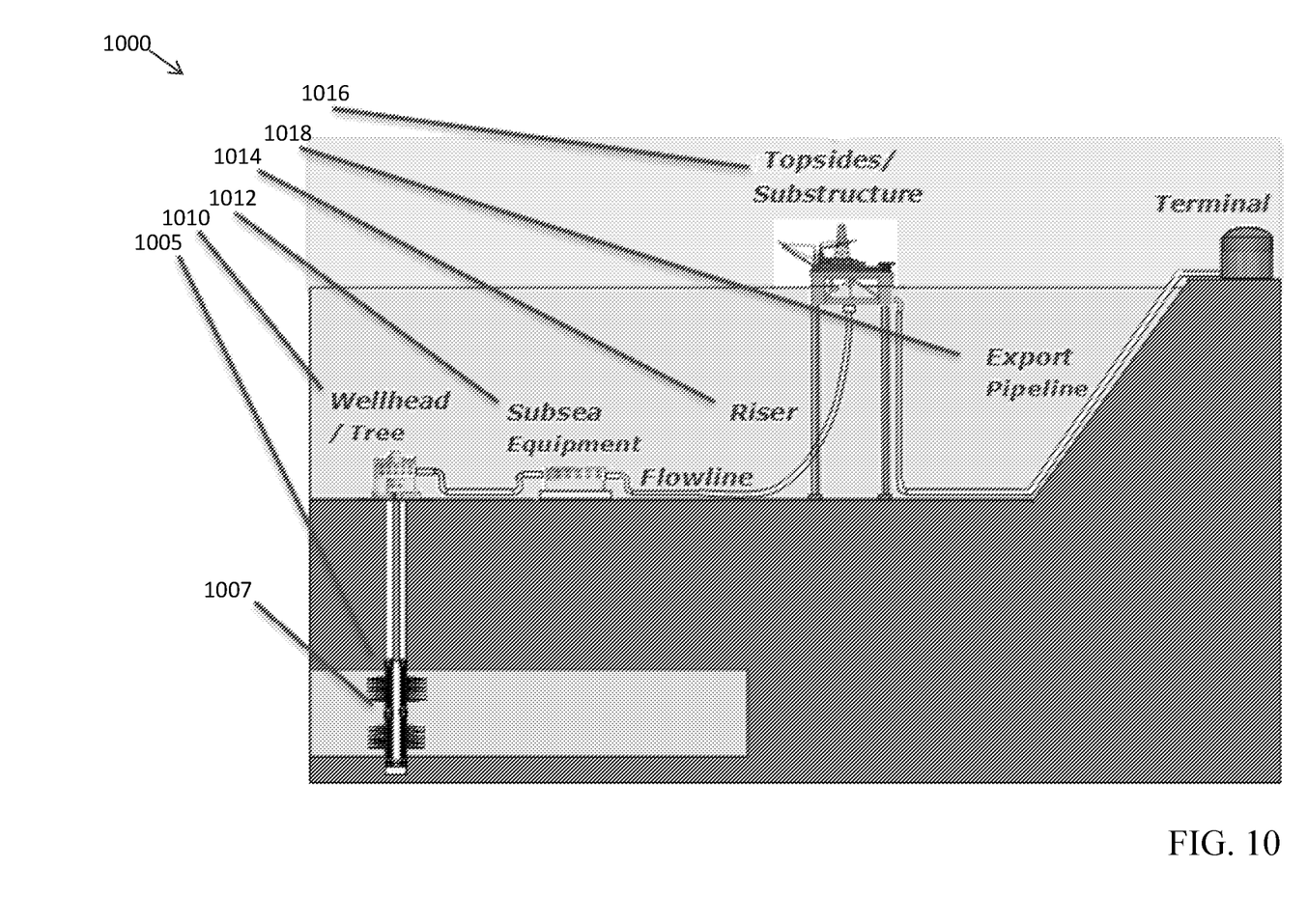
FIG. 10 is a schematic illustration of an offshore well production system in accordance with an example embodiment of the disclosure.

FIG. 10 illustrates an example well production system 1000 for an offshore well 1010. As explained previously, the need to separate sand and monitor the volume of sand separated from a produced resource also applies to offshore production wells. The example well production system 1000 includes a well 1005 having a production zone 107 and a wellhead 1010. A fluid stream containing the produced resource flows from the wellhead 1010 through subsea equipment 1012 and riser 1014 to production platform 1016. One or more sand separators similar to sand separator 115 described above can be located on the production platform 1016 for filtering sand from the fluid stream. As examples, the sand separators can be located on the top deck of the production platform or they can be located in a well bay below the top deck. To accommodate the space constraints on the production platform, the shape and configuration of the de-sander vessel and the accumulator vessel may be modified from that shown in FIG. 2. For example, placing the de-sander vessel and the accumulator vessel in a horizontal configuration where the longitudinal axes of the vessels are oriented horizontally instead of vertically may be beneficial on the production platform. Consistent with the previous description of the monitoring system, an exciter assembly and a receiver can be coupled to the accumulator vessel aboard the production platform for accurate monitoring of sand accumulation.

For any figure shown and described herein, one or more of the components may be omitted, added, repeated, and/or substituted. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

With respect to the example methods described herein, it should be understood that in alternate embodiments, certain steps of the methods may be performed in a different order, may be performed in parallel, or may be omitted. Moreover, in alternate embodiments additional steps may be added to the example methods described herein. Accordingly, the example methods provided herein should be viewed as illustrative and not limiting of the disclosure.

Referring generally to the examples herein, any components of the exciter assembly 120 and receiver 125 described herein can be made from a single piece (e.g., as from a mold, injection mold, die cast, 3-D printing process, extrusion process, stamping process, or other prototype methods). In addition, or in the alternative, a component of the apparatus can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to couplings that are fixed, hinged, removeable, slidable, and threaded.

Terms such as "first", "second", "top", "bottom", "side", "distal", "proximal", and "within" are used merely to distinguish one component (or part of a component or state of a component) from another. Such terms are not meant to denote a preference or a particular orientation, and are not meant to limit the embodiments described herein. In the example embodiments described herein, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The terms "a," "an," and "the" are intended to include plural alternatives, e.g., at least one. The terms "including", "with", and "having", as used herein, are defined as comprising (i.e., open language), unless specified otherwise.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Numerical end points of ranges disclosed herein are approximate, unless excluded by proviso.

Values, ranges, or features may be expressed herein as "about", from "about" one particular value, and/or to "about" another particular value. When such values, or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means±20% of the stated value, ±15% of the stated value, ±10% of the stated value, ±5% of the stated value, ±3% of the stated value, or ±1% of the stated value.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. An acoustic sand monitor system comprising:
an accumulator vessel configured to be coupled to a de-sander vessel, wherein the de-sander vessel separates sand from a fluid stream of a flow line and wherein the accumulator vessel collects the sand separated from the fluid stream;
an exciter assembly coupled to the accumulator vessel, wherein, when activated, the exciter assembly causes vibrations of the accumulator vessel;
a receiver coupled to the accumulator vessel, wherein the receiver detects an accumulator audio signal created by the vibrations of the accumulator vessel; and
a communications interface electrically coupled to the receiver, wherein the communications interface transmits the accumulator audio signal to a control system that analyzes the accumulator audio signal.

2. The acoustic sand monitor system of claim 1, wherein the accumulator vessel is suspended from the de-sander vessel.

3. The acoustic sand monitor system of claim 1, wherein the exciter assembly comprises one of a solenoid and a piezoelectric cell.

4. The acoustic sand monitor system of claim 1, wherein the exciter assembly comprises a speaker that emits an excitation audio signal.

5. The acoustic sand monitor system of claim 1, wherein the receiver comprises one of a microphone and a piezoelectric cell.

6. The acoustic sand monitor system of claim 1, wherein the communications interface comprises one of a data cable and a radio transmitter.

7. The acoustic sand monitor system of claim 1, wherein the control system is configured to compare the accumulator audio signal to a benchmark accumulator audio signal to determine a difference in frequency between the accumulator audio signal and the benchmark accumulator audio signal.

8. The acoustic sand monitor system of claim 7, wherein the control system is configured to calculate a volume of the sand in the accumulator vessel based on the difference in frequency between the accumulator audio signal and the benchmark accumulator audio signal.

9. The acoustic sand monitor system of claim 8, wherein the control system is configured to compare the volume of the sand in the accumulator to a previously calculated volume of sand and generates a report of sand volume change over time.

10. The acoustic sand monitor system of claim 1, wherein the control system is configured to predict a failure condition based on the volume of sand.

11. A method for monitoring an accumulator vessel coupled to a flow line, the method comprising:
generating a test excitation signal from an exciter assembly coupled to the accumulator vessel, the test excitation signal causing test vibrations of the accumulator vessel;
detecting, with a receiver coupled to the accumulator vessel, a benchmark accumulator audio signal generated by the test vibrations of the accumulator vessel;
transmitting, by a communications interface, the benchmark accumulator audio signal to a control system;
generating, at a predetermined time, a production excitation signal from the exciter assembly, the production excitation signal causing production vibrations of the accumulator vessel;
detecting, with the receiver, a production accumulator audio signal generated by the production vibrations of the accumulator vessel;
transmitting, by the communications interface, the production accumulator audio signal to the control system; and
comparing, by the control system, a frequency of the production accumulator audio signal to a frequency of the benchmark accumulator audio signal to determine a volume of sand in the accumulator vessel.

12. The method of claim 11, further comprising:
in response to determining the volume of sand in the accumulator vessel, generating, by the control system, an alert indicating an increase in the volume of sand in the accumulator vessel.

13. The method of claim 11, further comprising:
comparing, by the control system, frequencies of a plurality of production accumulator audio signals gathered from the receiver during a time period to determine a rate of change in the volume of sand during the time period.

14. The method of claim 13, wherein the control system predicts a failure condition based on the plurality of production accumulator audio signals gathered from the receiver during the time period.

15. The method of claim 14, wherein the failure condition is one of: a failed sand screen, a failed gravel pack, a water breakthrough, and a failed separator.

16. The method of claim 11, wherein the accumulator vessel is suspended from a de-sander vessel.

17. The method of claim 11, wherein the exciter assembly comprises a solenoid.

18. The method of claim 11, wherein the exciter assembly comprises a speaker that emits an excitation audio signal.

19. The method of claim 11, wherein the receiver comprises a microphone.

20. The method of claim 11, wherein the communications interface comprises one of a data cable and a radio transmitter.

* * * * *